(12) United States Patent
Beltran

(10) Patent No.: US 11,885,455 B2
(45) Date of Patent: Jan. 30, 2024

(54) ASYMMETRICAL FABRICS COMPOSITION FOR WINDING APPLICATIONS IN PIPE RELINING

(71) Applicant: Owens Corning Intellectual Capital, LLC, Toledo, OH (US)

(72) Inventor: Antoni Serarols Beltran, Suria (ES)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1301 days.

(21) Appl. No.: 16/394,065

(22) Filed: Apr. 25, 2019

(65) Prior Publication Data

US 2019/0249813 A1    Aug. 15, 2019

Related U.S. Application Data

(62) Division of application No. 15/512,074, filed as application No. PCT/US2015/056474 on Oct. 20, 2015, now Pat. No. 10,309,573.

(30) Foreign Application Priority Data

Oct. 24, 2014  (EP) ..................................... 14382418

(51) Int. Cl.
    *B32B 3/26*    (2006.01)
    *B32B 5/12*    (2006.01)
    (Continued)

(52) U.S. Cl.
    CPC .......... *F16L 55/1656* (2013.01); *B29C 63/04* (2013.01); *B29C 63/105* (2013.01);
    (Continued)

(58) Field of Classification Search
    CPC ..... B29C 63/044; B29C 63/14; B29C 63/105; B29C 70/32; B32B 3/263; B32B 5/12;
    (Continued)

(56) References Cited

U.S. PATENT DOCUMENTS 3,916,953 A * 11/1975 Nagayoshi .............. B29C 53/60
    138/132
4,081,303 A *  3/1978 Rogers .................... F16L 58/16
    428/36.1

(Continued)

FOREIGN PATENT DOCUMENTS

DE    4328658    3/1995
EP    1444408    11/2006

(Continued)

OTHER PUBLICATIONS

Office Action from JP Application No. 2020-102910 dated Apr. 1, 2021.

(Continued)

*Primary Examiner* — Robert B Davis
(74) *Attorney, Agent, or Firm* — Calfee, Halter & Griswold LLP

(57) ABSTRACT

A continuous fabric for use in forming a repair liner for reinforcing a pipe. The fabric includes a top layer and one or more bottom layers. The width of the top layer is less than the width of the continuous fabric and the density of the top layer is less than the density of at least one of the at least one or more bottom layers. The top layer may serve as a guide for winding the fabric in an overlapping pattern about a mandrel so that the essentially only the top layer is visible in the fabric winding.

24 Claims, 15 Drawing Sheets

(51) Int. Cl.
  *B32B 5/26* (2006.01)
  *B32B 7/05* (2019.01)
  *F16L 55/165* (2006.01)
  *B32B 5/02* (2006.01)
  *B32B 5/08* (2006.01)
  *B32B 5/10* (2006.01)
  *B32B 5/22* (2006.01)
  *B32B 7/02* (2019.01)
  *B29C 63/04* (2006.01)
  *B29C 63/10* (2006.01)
  *B29C 63/14* (2006.01)
  *B29C 73/04* (2006.01)
  *B29L 23/00* (2006.01)

(52) U.S. Cl.
  CPC .............. *B29C 63/14* (2013.01); *B29C 73/04* (2013.01); *B32B 3/263* (2013.01); *B32B 5/02* (2013.01); *B32B 5/08* (2013.01); *B32B 5/10* (2013.01); *B32B 5/12* (2013.01); *B32B 5/22* (2013.01); *B32B 5/26* (2013.01); *B32B 7/02* (2013.01); *B32B 7/05* (2019.01); *F16L 55/1655* (2013.01); *B29K 2913/00* (2013.01); *B29L 2023/001* (2013.01); *B29L 2023/22* (2013.01); *B32B 2250/20* (2013.01); *B32B 2262/02* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2262/106* (2013.01); *B32B 2262/14* (2013.01); *B32B 2307/72* (2013.01); *B32B 2597/00* (2013.01); *F16L 55/1651* (2013.01); *F16L 55/1652* (2013.01)

(58) Field of Classification Search
  CPC ..... B32B 5/22; B32B 5/26; B32B 7/05; F16L 55/1656
  See application file for complete search history.

(56) References Cited

U.S. PATENT DOCUMENTS

| | | | |
|---|---|---|---|
| 5,174,228 A | 12/1992 | Grimnes | |
| 5,579,809 A * | 12/1996 | Millward | F16L 58/1063 138/144 |
| 6,360,780 B1 | 3/2002 | Adolphs et al. | |
| 6,615,875 B2 | 9/2003 | Adolphs et al. | |
| 7,096,890 B2 | 8/2006 | Woolstencroft et al. | |
| 2002/0124898 A1 | 9/2002 | Renaud et al. | |
| 2010/0227093 A1 | 9/2010 | Kamiyama et al. | |
| 2012/0048455 A1 | 3/2012 | Rocher et al. | |
| 2015/0246501 A1* | 9/2015 | Den Besten | B32B 5/06 428/113 |

FOREIGN PATENT DOCUMENTS

| | | |
|---|---|---|
| EP | 2600047 | 6/2013 |
| EP | 3012503 | 4/2016 |
| EP | 3147550 | 3/2017 |
| JP | S54-008675 A | 1/1979 |
| JP | S54-003700 A | 2/1979 |
| JP | 2006-64166 A | 3/2006 |
| WO | 2014062539 | 4/2014 |
| WO | 2016064885 | 4/2016 |

OTHER PUBLICATIONS

Office Action from CN Application No. 201910551702.1 dated Nov. 3, 2020.
Office Action from JP Application No. 2017-522009 dated Mar. 23, 2020.
Extended European Search Report from EP 14382418.3 dated Sep. 28, 2015.
Office Action from EP Application No. 14382418.3 dated Jun. 28, 2018.
Extended European Search Report from EP 16195467.2 dated Feb. 1, 2017.
International Search Report and Written Opinion from PCT/US2015/056474 dated Jan. 25, 2016.
International Report on Patentability from PCT/US2015/056474 dated Apr. 25, 2017.
Office Action from U.S. Appl. No. 15/512,074 dated Jul. 6, 2018.
Office Action from U.S. Appl. No. 15/512,074 dated Sep. 13, 2018.
Notice of Allowance from U.S. Appl. No. 15/512,074 dated Jan. 24, 2019.
Office Action from CN Application No. 21580057608.0 dated Jun. 19, 2018.
Office Action from CN Application No. 201580057608.0 dated Dec. 26, 2018.
Office Action from JP Application No. 2017-522009 dated Jul. 22, 2019.

\* cited by examiner

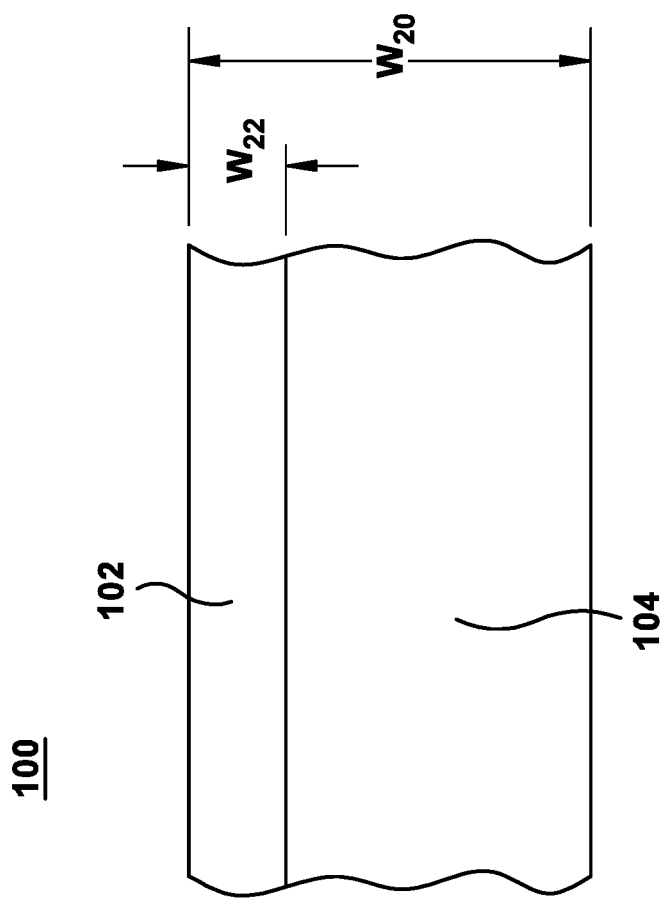

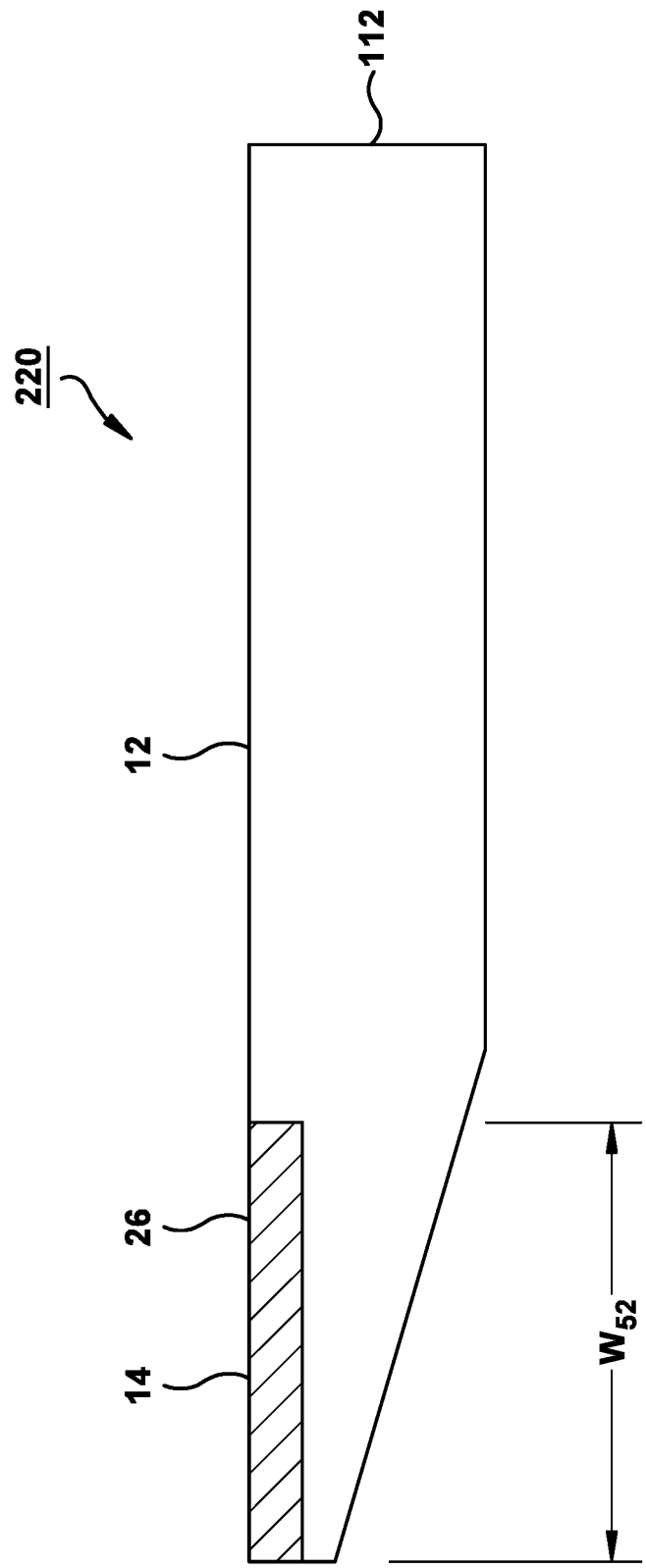

ASYMMETRICAL FABRICS COMPOSITION FOR WINDING APPLICATIONS IN PIPE RELINING

RELATED APPLICATIONS

The present application is a divisional of U.S. patent application Ser. No. 15/512,074, filed on Mar. 17, 2017, which is the U.S. national stage entry of PCT/US2015/056474, filed on Oct. 20, 2015, which claims the benefit of European Patent Application No. 14382418.3, filed Oct. 24, 2014, the entire disclosures of which are incorporated herein by reference.

BACKGROUND

Pipes leak or fail structurally over time and periodically require replacement or repair. Replacing certain pipes, especially underground, such as storm pipes or sewer pipes, can be extremely difficult and expensive. Accordingly, technologies have been developed to repair pipes in locations that are difficult to access, rather than to physically replace the pipe.

One repair technology involves the use of cured-in-place pipe liners that can be inserted within old pipes to essentially replace the old pipes. Specifically, cured-in-place pipe liners are known in which a flexible tube, or sock, is used to line the inner diameter of an old pipe. The liner may be constructed on a resin backed lining or may have resin applied during the initial installation. The liner may be installed from one point of entry to another by one of several known techniques. With the liner in place within the pipe, the resin is cured, and the liner essentially becomes a new pipe within the old pipe. The resin may be cured by one of several known techniques, including UV curing. Cure-in-place pipe liners are cost effective for several reasons, including because access is necessary only at the upstream and downstream ends of the pipe segment to be lined, which commonly are readily accessible through manholes.

One type of cured-in-place pipe is made from a glass fabric in a winding process on a mandrel, such as for example, as disclosed in U.S. Pat. No. 6,360,780 issued Mar. 26, 2002 and U.S. Pat. No. 6,615,875 issued Sep. 9, 2003, which are each incorporated in their entireties.

SUMMARY

The present application describes a continuous fabric and a method of using the continuous fabric to form a repair liner for reinforcing a pipe.

In an exemplary embodiment, the fabric includes a top layer, and one or more bottom layers. The width of the top layer is less than the width of the continuous fabric. The density of the top layer may be less than the density of the one or more bottom layers.

Further features and advantages of the invention will become apparent from the following detailed description made with reference to the accompanying drawings.

BRIEF DESCRIPTION OF THE DRAWINGS

Features and advantages of the general inventive concepts will become apparent from the following detailed description made with reference to the accompanying drawings.

FIG. 1c is a perspective view of a roll of the continuous fabric of FIG. 1a;

FIG. 2b is a perspective view of a roll of the continuous fabric of FIG. 2a;

FIG. 5b is a plan view of the continuous fabric of FIG. 5a;

FIG. 5d is a cross-sectional view of another continuous fabric;

DETAILED DESCRIPTION

Figure 1A:
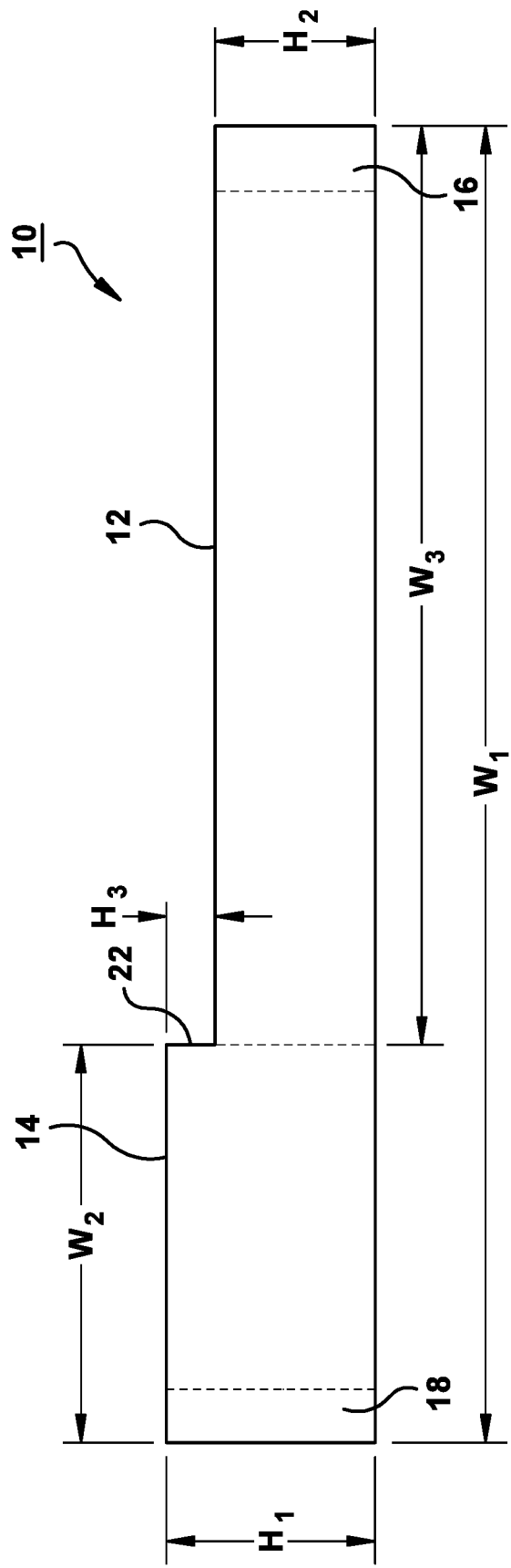
FIG. 1a is a cross-sectional view of a continuous fabric, showing one portion of the fabric thicker than another portion of the fabric.

This Detailed Description merely describes exemplary embodiments in accordance with the general inventive concepts and is not intended to limit the scope of the invention in any way. Indeed, the invention as described by the claims is broader than and unlimited by the exemplary embodiments set forth herein, and the terms used herein have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

The winding of a liner for subsequent use in a cured-in-place pipe installation has several challenges. For example, advantageous properties to the inside of the cured-in-place pipe differ from advantageous properties to the outside of the cured-in-place pipe. In general, mechanical properties are important toward the center and outside of the pipe, and surface finish properties are important on the inside of the pipe. The center and outside of the pipe may be subject to mechanical forces, such as tree roots or unauthorized digging. The inside of the pipe may be subject to highly abrasive forces.

The fabric liner may include two or more layers. Each layer may include any type of fiber suitable for providing desired structural qualities. The reinforcement fibers within each layer may be any type of organic or synthetic fibers. In some exemplary embodiments, the reinforcement fibers include any one or more of glass, carbon, polyesters, polyolefins, nylons, aramids, poly(phenylene sulfide), polysulfone (PS), polyether sulfone (PES), polyacrilonitrile (PAN), silicon carbide (SiC), boron nitride, and the like. In some exemplary embodiments, the fabric (or layer) may be a hybrid fabric (or layer) including multiple different types of fibers.

At least one advantage of the present invention over prior art is the assymetrical properties of the fabric. The fabric is assymetrical in both fabric placement, or density, and in structural dimension. The fibers are distributed within the fabric to benefit both mechanical properties on the outside of the cured-in-place pipe and surface finish properties on the inside of the cured-in-place pipe. The fabric is physically dimensioned to permit a winding process that is used to emphasize the asymmetrical fabric distribution.

The asymmetrical properties can further be described in reference to fiber weight. After the impregnation process, different levels of resin exist in the pipe composite due to the asymmetrical fiber qualities of the glass liner. The inventive fabric has a higher quantity of veil or fine mat fibers on the side of the fabric which will be exposed to the inside of the pipe, and be subject to abrasion and high-pressure operations, as well as testing. The higher quantity of fibers increases the resin content in impregnation. A smaller quantity of veil or fine mat fibers are located in the center and toward the outside of the pipe, so as to increase the mechanical properties of the pipe in those portions.

The present application describes various exemplary methods and apparatus for forming a continuous fabric for use in forming a repair liner for reinforcing a pipe. In an exemplary embodiment, the fabric includes a continuous first portion, and a continuous second portion. The maximum thickness of the first portion is less than the maximum thickness of the second portion. The increase in thickness between the first portion and the second portion may form a step. The step may serve as a guide for winding the fabric in an overlapping pattern about a mandrel so that essentially only the second portion is visible in the fabric winding.

In another embodiment of the invention, a continuous fabric includes a top layer, and one or more bottom layers. The width of the top layer is less than the width of the continuous fabric and the density of the top layer is less than the density of at least one of the at least one or more bottom layers. The top layer may serve as a guide for winding the fabric in an overlapping pattern about a mandrel so that essentially only the top layer is visible in the fabric winding.

In another embodiment of the invention, a continuous fabric includes a top layer, a top intermediate layer, a bottom intermediate layer, and a bottom layer. The width of the top layer is less than the width of the continuous fabric. The top layer may serve as a guide for winding the fabric in an overlapping pattern about a mandrel so that essentially only the top layer is visible in the fabric winding.

In another embodiment, a continuous fabric includes a continuous first portion and a continuous second portion. The density of at least a portion of the first portion is more than a density of at least a portion of the second portion. The width of the first portion may be more than the width of the second portion. The thickness of the fabric may be constant from edge to edge.

In another embodiment, a method of manufacturing a repair liner for reinforcing a pipe is disclosed. The method includes selecting a continuous fabric having a top layer, a top intermediate layer, and a bottom intermediate layer, wherein the width of the top layer is less than the width of the continuous fabric and the fiber density of the top layer is less than the fiber density of the bottom intermediate layer; and wrapping the continuous fabric around a mandrel in an orientation with the top layer outward. The continuous fabric is overlapped on a mandrel in a pattern with the top layer essentially covering the length of the liner.

Referring now to the drawings, a cross-sectional view of a continuous fabric is shown in FIG. 1a. The exemplary continuous fabric 10 is illustrated in outline form. One skilled in the art should interpret the fabric 10 as any continuous fabric for use in forming a repair liner for reinforcing a pipe. The fabric 10 may generally include fibers. The fabric may have any number of layers in the fabric. The fabric may be made with layers made from various fiberglass manufacturing methods and layers having various varieties of glass density.

The continuous fabric is manufactured for temporary storage in roll form in relatively large quantities. As seen in FIG. 1c, a perspective view of a roll of the continuous fabric is shown. The continuous roll 10 is shown being unrolled from a roll 30. The fabric 10 will be manufactured, rolled, unrolled and wrapped such that the liner in an uninstalled position will have the step facing outward.

The continuous fabric 10 includes a continuous first portion 12 and a continuous second portion 14. Each portion 12, 14 runs essentially the length of the fabric 10. FIG. 1 is a typical sectional view at any point along the length of the continuous fabric 10. As shown, one portion of the fabric is thicker than another portion of the fabric. In FIG. 1a, the thicknesses across the entire width of the first portion 12 and the second portion 14 are shown to be constant, but the thicknesses may vary, which is discussed herein. Whether the thicknesses vary or not, the maximum thickness of the second portion will be greater than the maximum thickness of the first portion. In regard to the fabric 10, the first portion 12 has a thickness $H_2$ and second portion 14 has a thickness $H_1$. As shown, the thickness $H_2$ of the first portion 12 is less than thickness $H_1$ of the second portion 14. For example, the thickness $H_1$ may by 850 mm.

The difference in thicknesses between the two portions of the fabric creates a shoulder or step. This step may serve as a guide for winding the fabric in an overlapping pattern about a mandrel so that the essentially only the second portion is visible in the fabric winding. Specifically, the fabric is wound around the mandrel so that the next wrap nests essentially in a contiguous position upstream from the step and on the top face of the first portion. This wrapping technique is discussed in greater detail herein.

The difference in thicknesses between the first portion and the second portion is not intended to be dramatic. As discussed herein, the difference is intended, among other features, to create a subtle step for use in wrapping the fabric around a mandrel. Referring to FIG. 1a, a step 22 has a height $H_3$. This step height may vary. For example, the quantitative difference in thickness between the first portion and the second portion may be 1 mm. The step height may be indirectly assessed by the difference in thickness between the two portions. An exemplary embodiment has a maximum thickness of the first portion between 75% and 95% of the maximum thickness of the second portion. It will be understood by one with skill in the art that the quantitative thickness difference between the two portions may vary in the practice of the invention.

The thicknesses may vary in either portion, and by one or more technique. For example, sections of one or more areas within a portion may include less fiber density than other sections of the portion. For example, some or all of edge section 16 of the first portion 12 and some or all of edge section 18 of the second portion 14 are manufactured with less fiber than the remainder of the first portion 12 and second portion 14, respectively. Thus, sections 16, 18 may compress more during a wrapping application, than in proportion to the first portion 12 and the second portion 14, respectively.

The first portion and the second portion may be different in width as well. In one embodiment, the first portion may be two or more times wider than the second portion. Referring again to FIG. 1a, the continuous fabric 10 has a total width $W_1$. The first portion 12 has a width $W_3$ and second portion 14 has a width $W_2$. As shown, the width $W_3$ of the first portion 12 is greater than width $W_2$ of the second portion 14.

The actual width of the first portion or second portion, or the ratio to each other, will vary in the practice of this invention. For example, the width of the first portion may vary. An exemplary width of the first portion is between 300 mm and 1,300 mm. The ratio of the width of the first portion to the second portion may vary. For example, the width of the first portion may be between 30% and 90% of the total width of the continuous fabric. An exemplary second portion may have a width of between 100 mm and 500 mm. The width of the second portion may be between 10% and 50% of the total width of the continuous fabric. As discussed, it will be understood by one with skill in the art that the differences in the physical dimensions of the two portions may vary in the practice of the invention.

As discussed herein, the thicknesses of either or both portions may vary from edge to edge of the continuous fabric. In one embodiment, each portion thins out near the outer edge of the fabric. This thinning is advantageous to the wrapping pattern to minimize the step pattern from being repeated from the fabric to the final wrapped liner. In other words, without the thinning near the outer edge, each subsequent loop of fabric would be disposed in a "stepped up" position relative to the adjacent upstream loop. Thus, the final look of the liner would be the top surface of each loop of exposed second portion would be stepped up or have a sharp edge separating it from the next loop. The thinning allows subsequent loops to nest down such that the outer surface of the liner is smoother. This wrapping technique is discussed in more detail herein.

Figure 1B:
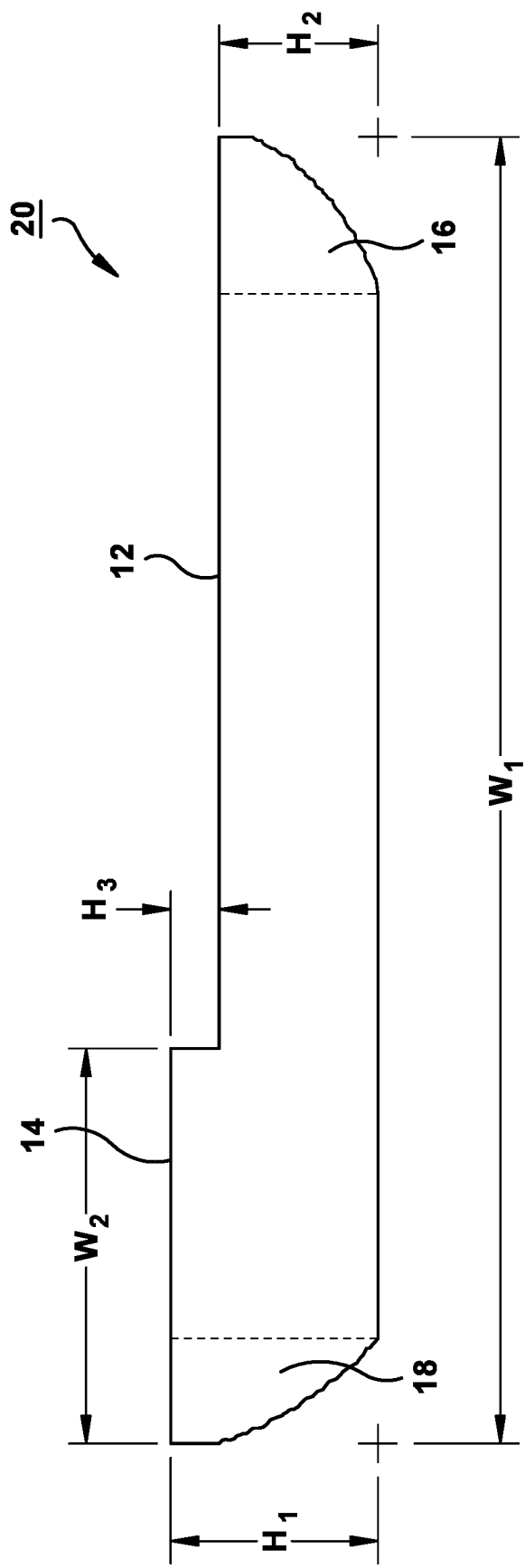
FIG. 1b is a cross-sectional view of another continuous fabric, showing portions of the fabric having reduce thickness along the edges.
Figure 1C:
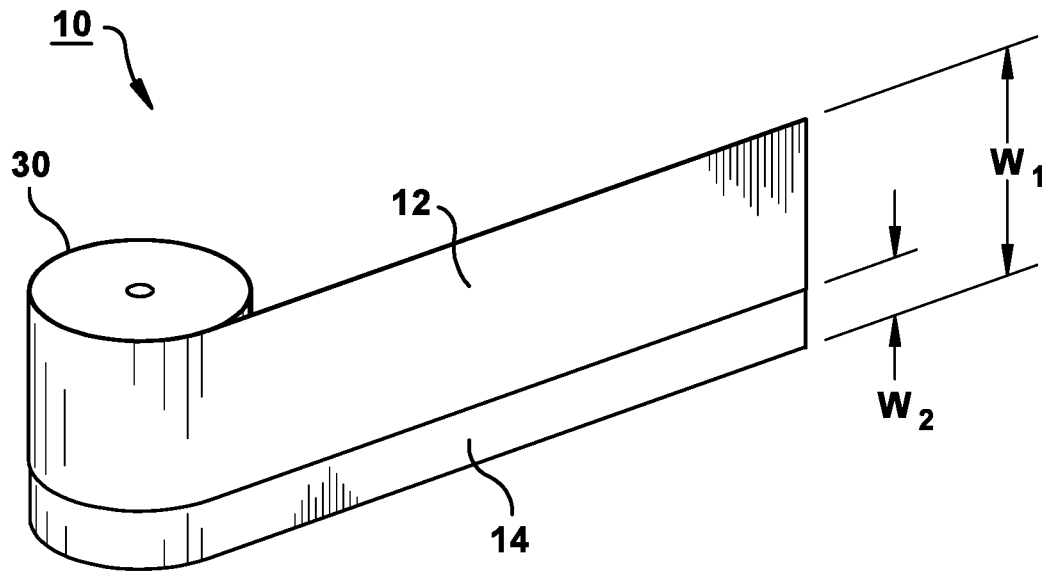
Figure 2B:
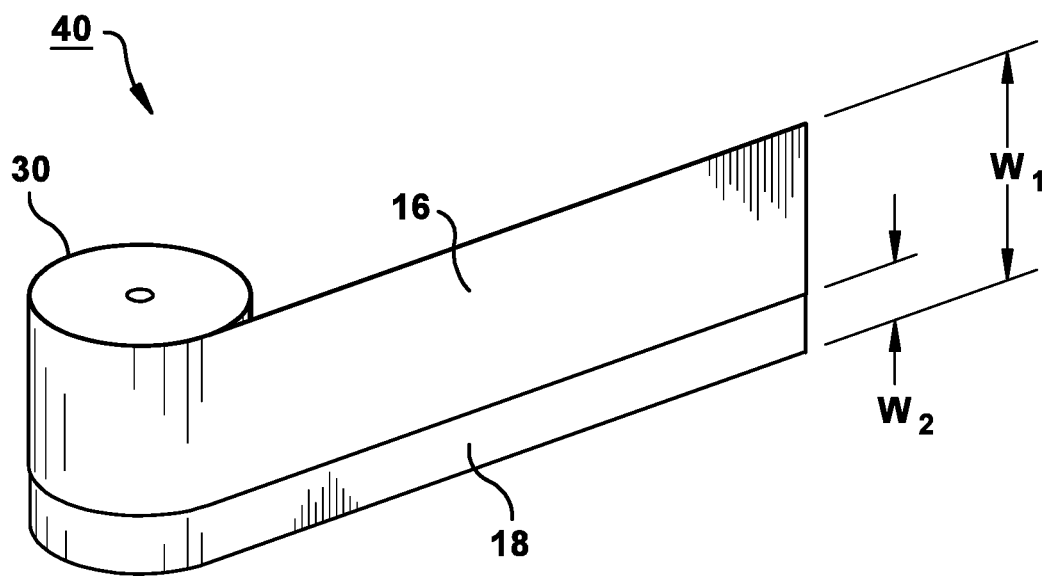

Referring now to FIG. 1b, a cross-sectional view of another continuous fabric is shown. The exemplary fabric 20 has a reduced thickness along the edges. Specifically, the thickness of both the first portion and the second portion is less at the outer edge of the continuous fabric. The thickness is shown to be less with "thickness loss" along the bottom outer edge of the fabric, but this illustration is for example only. In the practice of the invention, some or all of edge section 16 of the first portion 12 and some or all of edge section 18 of the second portion 14 are manufactured with less fiber density than the remainder of the first portion 12 and second portion 14, respectively. Edge section 16, 18 consequently compress more during a wrapping application in proportion to the first portion 12 and second portion 14, respectively. The compression will take place in the layer or layers in which the fiber is missing. It will be understood by one with skill in the art that the difference in thicknesses toward the outer edge will not be dimensionally exact and will vary throughout the length of the wrap when reduction in fiber is the method.

The inventive fabric may be studied from perspectives other than thickness. For example, the density of the fabric may vary in different portions of the fabric. For example, the fabric may include a top layer, and one or more bottom layers. The density of the top layer may be less than the density of at least one of the at least one or more bottom layers. The change in density is believed to have advantageous effects on the structural properties of the finished lining. These properties are discussed in greater detail herein.

Figure 2A:
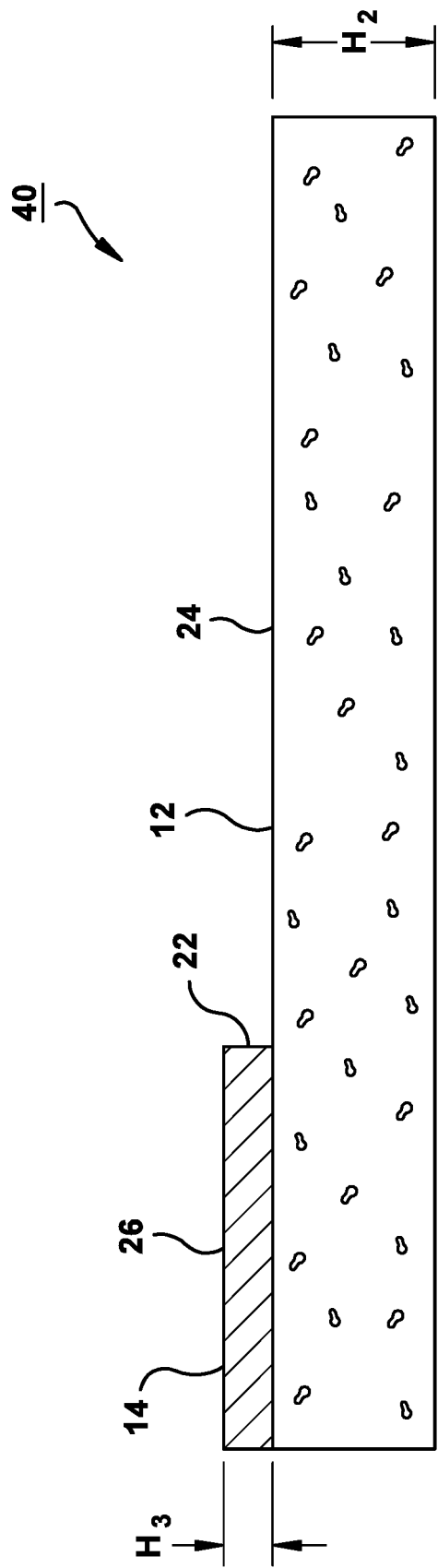
FIG. 2a is a cross-sectional view of another continuous fabric.

A cross-sectional view of another continuous fabric is shown in FIG. 2a. The fabric 40 includes a first portion 12 and a second portion 14. The second portion includes a top layer 26 which is not in the first portion 24. The first portion is formed of one or more layers forming a base 24. The top layer 26 has a density which is less than the overall density of the one or more layers forming the base 24. As such, the density of the first portion is greater than the density of the second portion. A perspective view of a roll 30 of the continuous fabric 40 is shown in FIG. 2a.

Figure 3:
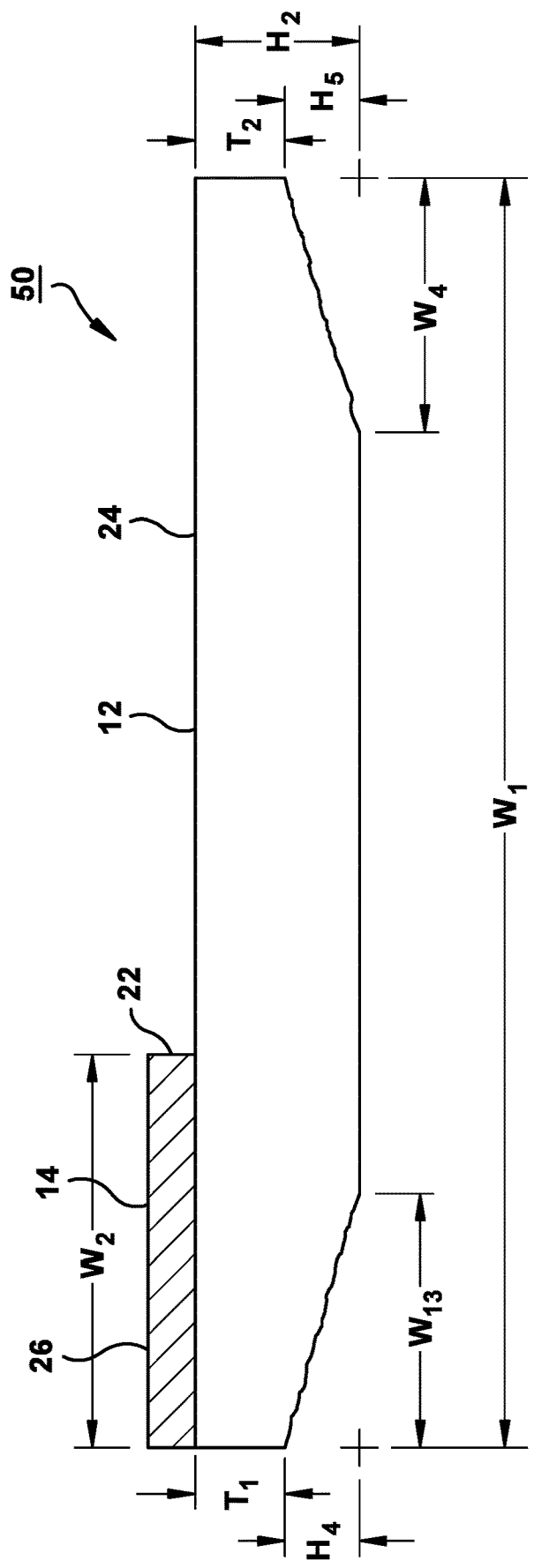
FIG. 3 is a cross-sectional view of another continuous fabric, showing portions of the fabric having reduce thickness along the edges.
Figure 4:
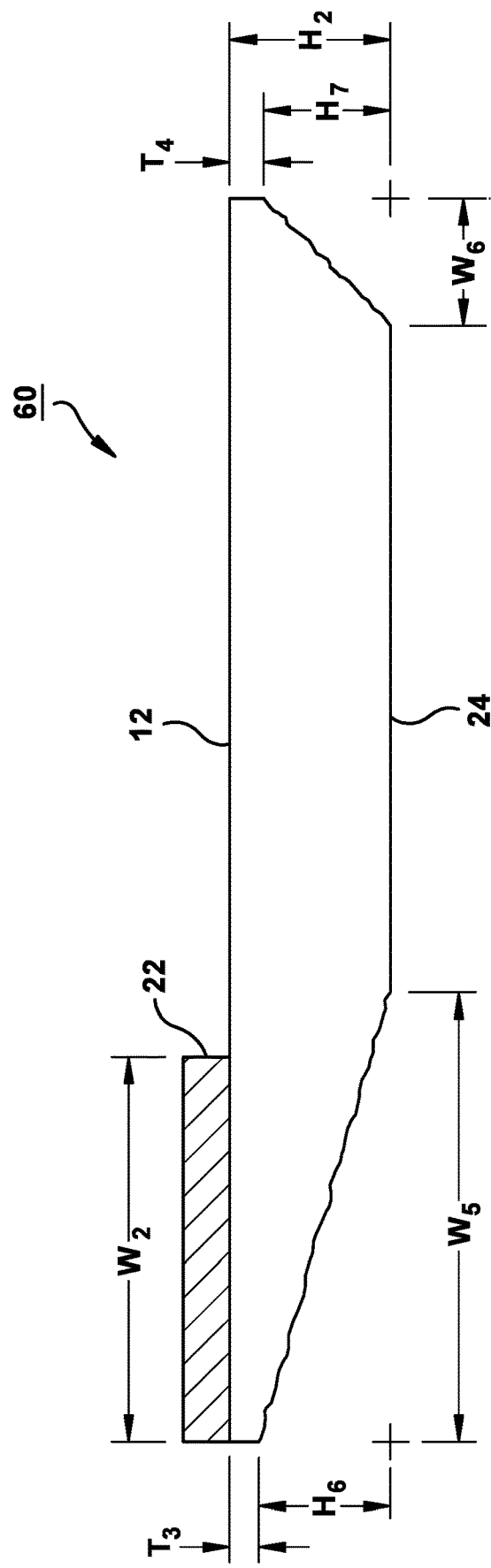
FIG. 4 is a cross-sectional view of another continuous fabric.

As discussed herein, the thickness of the fabric may vary at points across the width of the fabric. FIGS. 3 and 4 are cross-sectional views of other continuous fabrics. Each fabric has one or more portions of reduced thicknesses along the edges. The portions are illustrated to provide examples of varying thickness and width. The figures are for example only, and any thinness near the edges, relative to the fabric thickness, may be of other shapes, such as for example, reduced thickness on the top and bottom of the fabric at and near the edge.

Referring now to FIG. 3, a cross-sectional view of another continuous fabric is shown. The fabric 50 includes two sections of reduced thickness, a section in the first portion 12 having a width $W_4$ and a height $H_5$, and a section in the second portion 14 having a width $W_{13}$ and a height $H_4$. As such, the first portion has a thickness of $T_2$ at the outer edge and the second portion has a thickness of $T_1$ at the outer edge. FIG. 4 shows another continuous fabric having reduced thickness near the outer edge. The fabric 60 includes two sections of reduced thickness, a section in the first portion 12 having a width $W_6$ and a height $H_7$, and a section in the second portion 14 having a width $W_5$ and a height $H_6$. As such, the first portion has a thickness of $T_4$ at the outer edge and the second portion has a thickness of $T_3$ at the outer edge.

It will be understood by one with skill in the art that the thicknesses of the outer edge of the fiber may vary in the practice of this invention. For example, the base layer may be less than 40 mm thick along the outer edges of the continuous fabric. In another exemplary fabric, the base layer may be less than 5 mm thick along the outer edges of the continuous fabric. In another exemplary fabric, the base layer is less than 2 mm thick along the outer edges of the continuous fabric. In another exemplary fabric, the base is less than 1 mm thick along the outer edges of the continuous fabric.

The distance from the outer edge over which the base layer gradually increases until it reaches the standard thickness, or maximum thickness, also may vary in the practice of this invention. For example, the base layer may vary in thickness from the outer edge a distance of 50 mm. In another exemplary fabric, the base layer varies in thickness from the outer edge a distance of less than 25 mm. In another exemplary fabric, the base layer varies in thickness from the outer edge a distance of less than 10 mm.

Figure 5A:
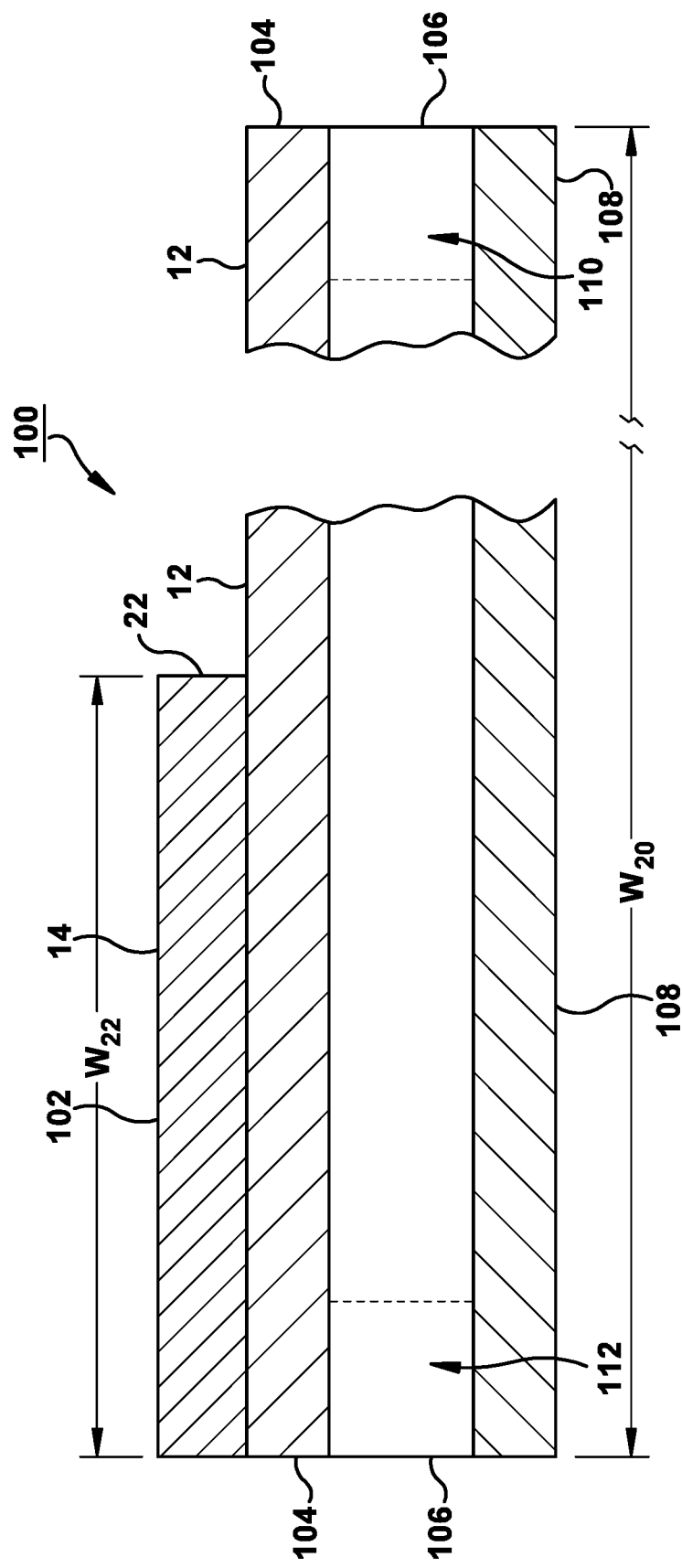
FIG. 5a is a cross-sectional view of another continuous fabric, showing a fabric with multiple layers.

Referring now to FIG. 5a, a cross-sectional view of continuous fabric having multiple layers is shown. The fabric has a total of four layers. The multi-layer fabric includes a top layer, a top intermediate layer, a bottom intermediate layer, and a bottom layer. The width of the top layer is less than the width of the continuous fabric. Three layers cover the entire width of the fabric and a top layer covers only a portion of the top surface of the fabric. As discussed herein, the top surface is designated with reference to the surface which is facing up during the winding orientation. After being reversed in installation, this surface is facing inward in the installation orientation. It will be understood by one with skill in the art that the number of layers in the fabric may vary in the practice of this invention.

The exemplary fabric 100 shown in FIG. 5a includes a top layer 102 having a width $W_{22}$. A plan view of the exemplary fabric 100 is shown in FIG. 5b. As discussed, the width as shown is less than a third of the total width $W_{20}$ of the fabric. The top layer may be a so-called veil layer and include random oriented fibers. For example, the top layer may have a fiber density of between 10-80 g/m². This relatively low fiber density has beneficial properties in the exposed top layer of the winding, as discussed herein.

The next layer, or upper most of the base layers, is the top intermediate layer 104. The top intermediate layer may also be a veil layer and include random oriented fibers. However, the top intermediate layer may not be of the same fiber weight as the top layer. The top intermediate layer 104 may also have a fiber density of between 10-50 g/m². As discussed herein, this top intermediate layer 104 is generally covered at the completion of the winding operation. However, the veil layer 104 provides a backing to the top layer 102 that is believed to have beneficial properties.

The difference in width between the top layer and the top intermediate layer creates a step along the top surface of the fabric. As discussed herein, a step 22 is formed on the inward side of the top layer 102. The step height, or the difference in thicknesses between the first portion and the second portion, is not intended to be dramatic. As discussed herein, the difference is intended, among other features, to create a subtle step for use in wrapping the fabric around a mandrel.

The third layer of the exemplary fabric 100 has different fiber characteristics. The bottom intermediate layer 106 generally has a higher density than the top layer 102 or the top intermediate layer 104. For example, the bottom intermediate layer 106 may include long oriented chopped fibers. The layer may have a fiber density of 300-600 g/m² across most or all of its width. As shown, the bottom intermediate layer 106 includes edge sections 110, 112 along the outer edges of the continuous fabric that are less in fiber content. Thus, the fabric 100 will become thinner during the winding application along the outer edges of the continuous fabric than along the center of the continuous fabric.

The thickness of the outer edge after winding will now be discussed. It will be understood by one with skill in the art that the thickness of the outer edge of the fabric after winding in the fabric may vary in the practice of this invention. For example, the bottom intermediate layer 106 may be 10% thinner along the outer edges of the continuous fabric 100 compared to the bottom intermediate layer 106 along the centerline of the continuous fabric 100. From a quantitative sense, the bottom intermediate layer 106 may be less than 5 mm thick along the outer edges of the continuous fabric. In another example, the bottom intermediate layer 106 may be less than 2 mm thick along the outer edges of the continuous fabric. In another example, the bottom intermediate layer 106 may be less than 1 mm thick along the outer edges of the continuous fabric.

The bottom layer of the fabric will be farthest away from the mandrel when wrapped, and closest to the pipe when installed. The bottom layer 108 in the exemplary fabric 100 covers the total width of the fabric, and generally has the same fiber content from edge to edge. The bottom layer 108 may include random chopped fibers. The fiber density of the bottom layer 108 may be between 100-400 g/m². In another embodiment, the bottom layer 108 may include continuous weft fibers, and the fiber density of the bottom layer 108 may be between 35 g/m² and 700 g/m², such as for example, 55 g/m².

Figure 5C:
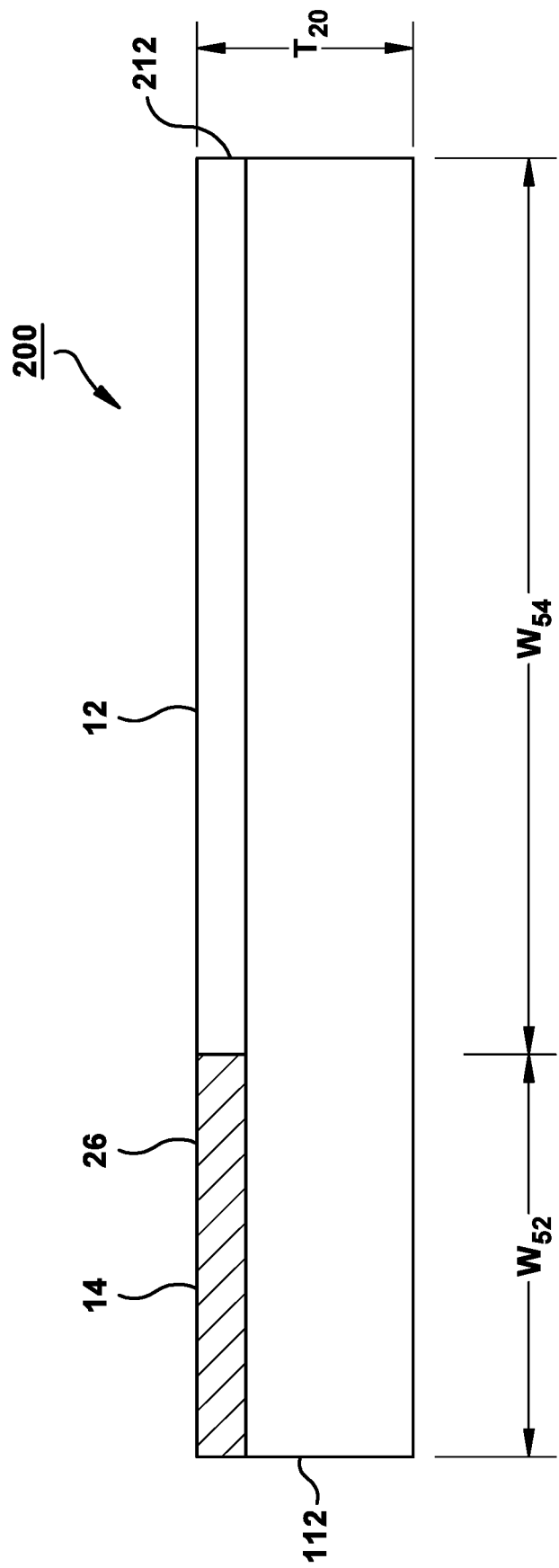
FIG. 5c is a cross-sectional view of another continuous fabric.

Referring now to FIG. 5c, a cross-sectional view of continuous fabric having multiple layers is shown. The fabric 200 has a thickness that is essentially constant from edge to edge. For example, the thickness $T_{20}$ may be between 75 and 100 mm. The fabric 200 includes a first portion 12 and a second portion 14. The first portion is wider than the second portion. The top layer 14 has a density that is less than the density of either the first intermediate portion 212 or bottom intermediate portion 112. Thus, at least a portion of the first portion 12 has a density which is more than a density of at least a portion of the second portion 14.

A similar embodiment is shown in FIG. 5d. The fabric 220 has a thickness that thins at one edge, as shown. The fabric 220 includes a first portion 12 and a second portion 14. The first portion is wider than the second portion. The top layer 14 has a density that is less than the density of the intermediate portion 112. Thus, at least a portion of the first portion 12 has a density which is more than a density of at least a portion of the second portion 14.

The material properties of exemplary glass liners will now be discussed. The properties will be discussed in reference to Table 1.

TABLE 1

Material Properties of Fabric & Test Data

| | Sample A | Sample B | Sample C | Sample D |
|---|---|---|---|---|
| Top layer | — | — | 30 g/m² | — |
| Top intermediate layer | — | 30 g/m² | 30 g/m² | 50 g/m² |
| Intermediate/ bottom layer | 725 g/m² (combination of random and oriented) | 695 g/m² (combination of random and oriented) | 695 g/m² (combination of random and oriented) | 675 g/m² (combination of random and oriented) |

TABLE 1-continued

Material Properties of Fabric & Test Data

|  | Sample A | Sample B | Sample C | Sample D |
|---|---|---|---|---|
|  | fibers) | fibers) | fibers) | fibers) |
| % oriented fibers | 55 | 55 | 55 | 55 |
| Flex. E-modulus (MPa) | 15400 | 15300 | 14167 | 11254 |
| Flex. Strength (MPa) | 385 | 395 | 347 | 317 |
| Fiber content (%) | 50 | 49 | 46.1 | 45.0 |

Table 1 includes data for laminates wound and cured with each of the four example fabrics. Each fabric may include up to three or more layers, such as for example, the top layer, the top intermediate layer, and the bottom intermediate layer, such as for example, fabric 100 in FIG. 5b. In testing, one or more rolls of each Sample A, B, C, D was used to produce a wound laminate. The laminate was produced using a standard UV-curable CIPP resin, such as for example, based on Orthophthalic Acid and Neopentylglycol (ortho/npg)—Composition and Properties according DIN18820 gr. 3 or EN 13121 gr. 4.

The first Sample A is a prior art product. No top layer is included, and no top intermediate layer is included in Sample A. The test data included in Table 1 includes the Flex E-modulus and Flex Strength for a laminate produced from fabric of Sample A.

Samples B, C and D are also included in Table 1. Samples B and C are constructed with a top intermediate layer from a 30 g/m² veil. This top intermediate layer is believed to be too thin to guarantee long term resistance to abrasion on the inside layer of a cured pipe. In contrast, Sample D has an increased thickness of top intermediate layer 50 g/m². However, as seen in Table 1, the increased thickness has an immediate and negative impact on the mechanical properties, and also costs, relative to Samples B and C.

The material properties of several glass liners constructed in accordance with the invention will now be discussed. The properties will be discussed in reference to Table 2.

TABLE 2

Material Properties of Fabric

|  | Sample E | Sample F |
|---|---|---|
| Top layer | — | 25 g/m² |
| Top intermediate layer | 25 g/m² | 25 g/m² |
| Intermediate/bottom layer | 700 g/m² (combination of random and oriented fibers) | 600 g/m² (combination of random and oriented fibers) |
| % oriented fibers | 69 | 69 |
| Fiber content (%) | 50 | 50 |

The present invention is directed to a fabric with a thick layer, with robust properties, at the inside of the liner and a thin top intermediate layer. As a result, the fabric may be wound and cured into a laminate with high mechanical properties, such as for example, as offered by Samples B and C, without sacrificing the robustness of the inside layer, as offered by Sample D.

Sample E is an inventive fabric which has similar construction to Samples B and C, but it is believed has increased properties due to increased oriented fiber content. For example, the oriented fiber may be as high as 69%. It is believed a fabric having the properties of Sample E, once wound and cured into a laminate, would have improved mechanical properties and robustness relative to Samples A-D, such as for example, the laminate may have a Flex. E-modulus of 18800 MPa and the Flex Strength of 460 MPa.

The features of another proposed and inventive fabric are described in Table 2 as Sample F. This sample has similar construction to Sample E, but in addition to the increased oriented fiber content, Sample F adds a top layer (25 g/m²) on the top intermediate layer (25 g/m²) to guarantee inner surface quality without impacting mechanical properties. It is believed a fabric having the properties of Sample F, once wound and cured into a laminate, may have improved mechanical properties and robustness relative to Samples A-D, such as for example, the laminate may have a Flex. E-modulus of 18500 MPa and the Flex Strength of 440 MPa.

Figure 6:
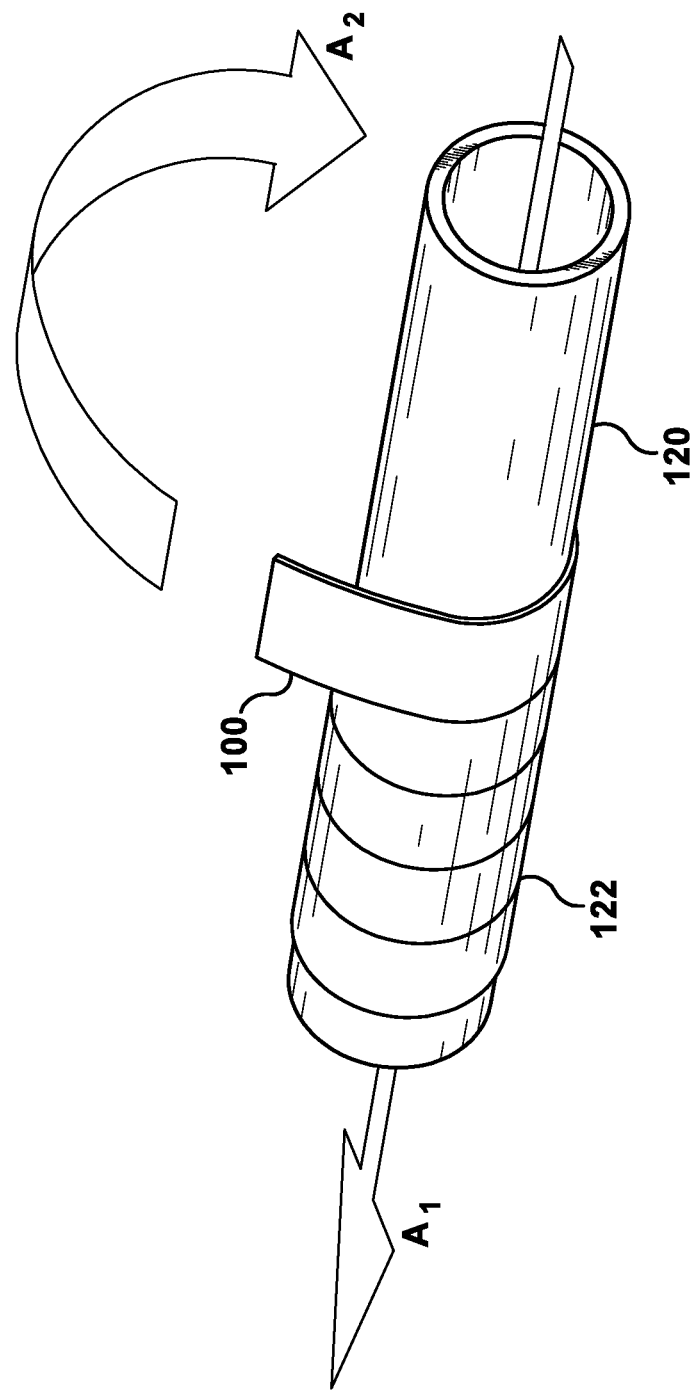
FIG. 6 is a perspective view of the application of the continuous fabric of FIG. 5a to a mandrel.

A method of use of the inventive fabric will be discussed. The fabric will be applied to a mandrel in an overwrapping pattern to form a liner. The general process of fabric winding is known in the art, and it will be understood by one with skill in the art that any known and acceptable mandrel winding machine may be used in the practice of this invention. For example, FIG. 6 is a perspective view of the application of the continuous fabric 100 of FIG. 5a to a mandrel. A film bag, or sock (not shown), is placed over the mandrel before the winding begins. As the fabric 100 is applied around the mandrel 120 in a direction $A_2$, the mandrel rotates, and the sock move, or is pulled, in an axial direction $A_1$.

Figure 7:
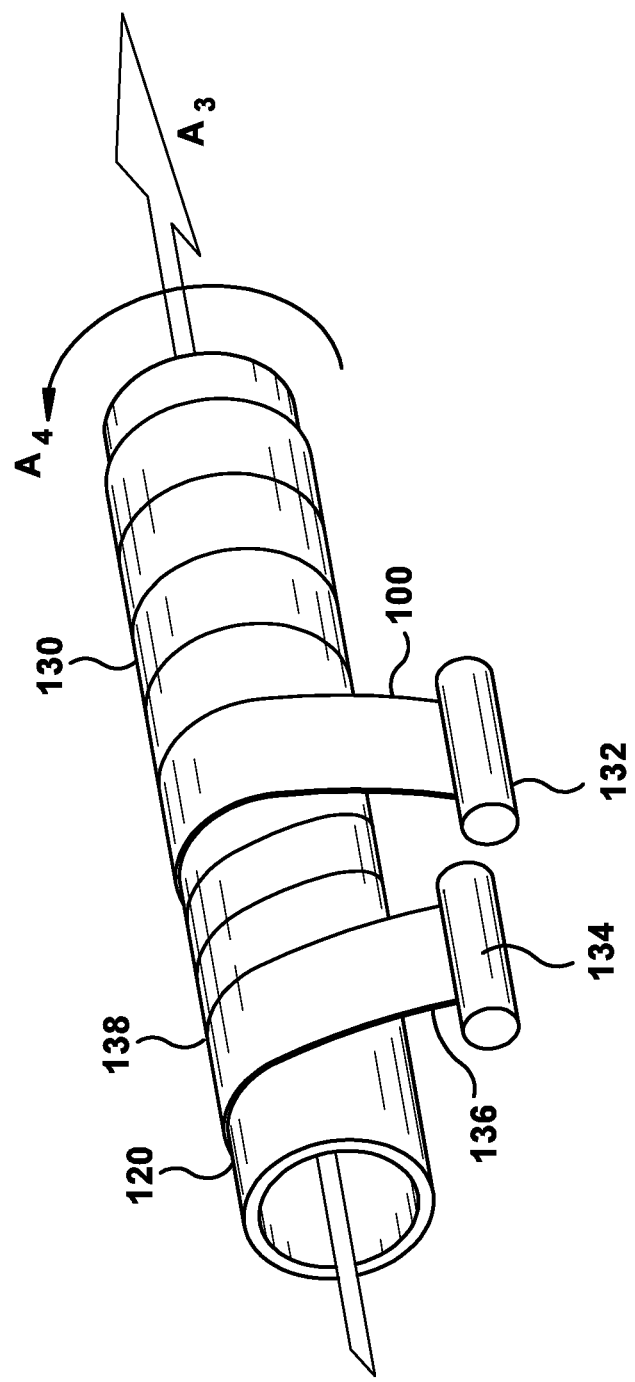
FIG. 7 is a perspective view of another application of the continuous fabric of FIG. 5a to a mandrel.

Another exemplary method is shown in FIG. 7. In this perspective view, the continuous fabric is applied to a mandrel 120. In this method, a continuous fabric 100 is selected having a top layer, a top intermediate layer, and a bottom intermediate layer. As discussed herein with reference to FIG. 5a, the width of the top layer is less than the width of the continuous fabric and the fiber density of the top layer is less than the fiber density of the bottom intermediate layer. Further, applying with fabric in the direction opposite $A_1$ is possible by changing the circular direction of the mandrel axis.

Figure 8:
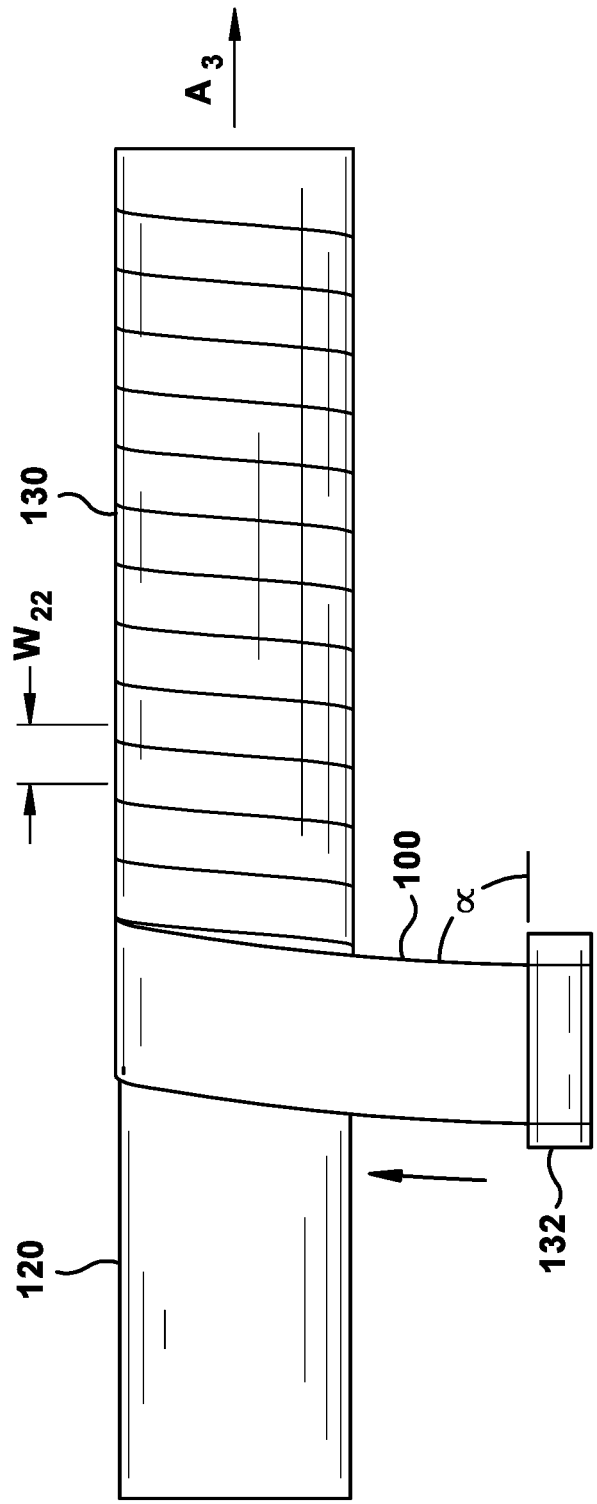
FIG. 8 is front view of the application shown in FIG. 7.

As known in the art, a plurality of rolls may be used in the winding process. In this winding process, two glass fabric rolls are used. With the fabric on a first mounted roll 132, the continuous fabric 100 is wrapped around a mandrel 120 in an orientation with the top layer outward and in an overlapping pattern with the top layer essentially covering the length of the liner. Downstream from the fabric, a second layer is applied over the sock. As shown, continuous fabric 136 is wrapped from a second mounted roll 134 and applied to the mandrel 120. The second continuous fabric 136 forms loops 138 around the circumference of the mandrel. Exemplary loops 130 of the first continuous fabric 100 are also shown. A front view of the application is shown in FIG. 8.

The method has several aspects which are tailored to structural features of the inventive fabric. The method may include the steps of moving the mandrel in an upstream direction at a predetermined axial speed, rotating the mandrel in a direction away from the continuous fabric at a predetermined rotational speed, and forming repetitive loops of fabric around the mandrel circumference. As shown in FIG. 8, the loops 130 are repetitive in angle on the mandrel axis and cover a portion of the previous upstream loop. Thus, the axial length between two adjacent loops on the liner is constant, and in this embodiment, is the same as the width of the top layer of the fabric. In other words, the subsequent downstream loop leaves an uncovered, upstream loop 130. With reference to FIG. 5a, the width of the loop 130 is essentially the width $W_{22}$ of the top layer 102. With this pattern, the top layer is not overlapped upon itself along the axial length of the liner.

Figure 9:
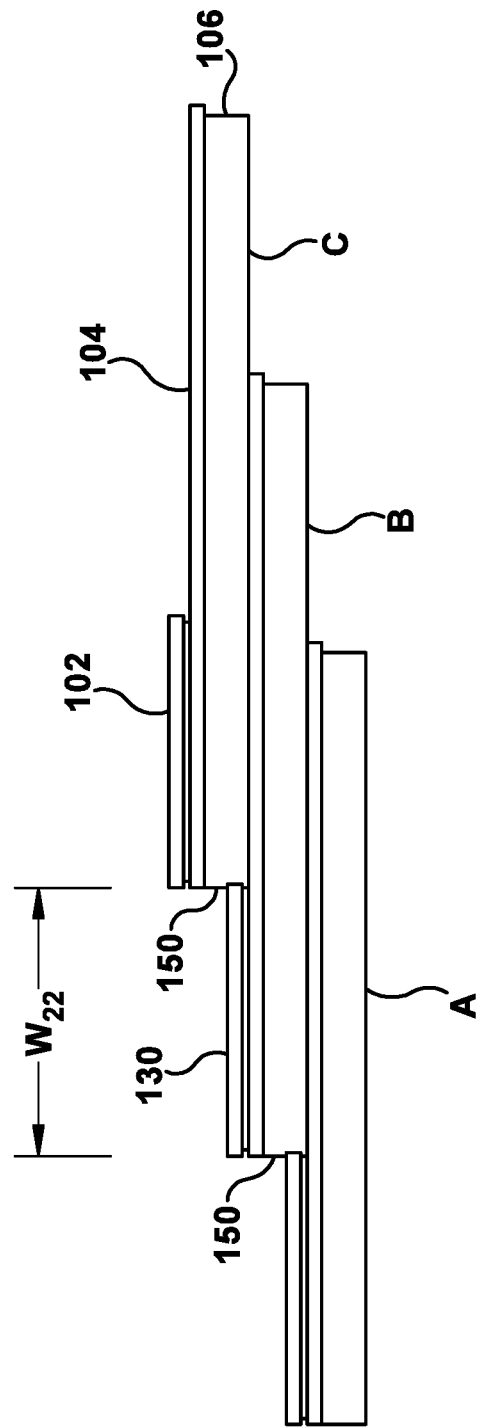
FIG. 9 is a partial sectional view of a winding from a continuous fabric is shown in an application orientation.
Figure 10:
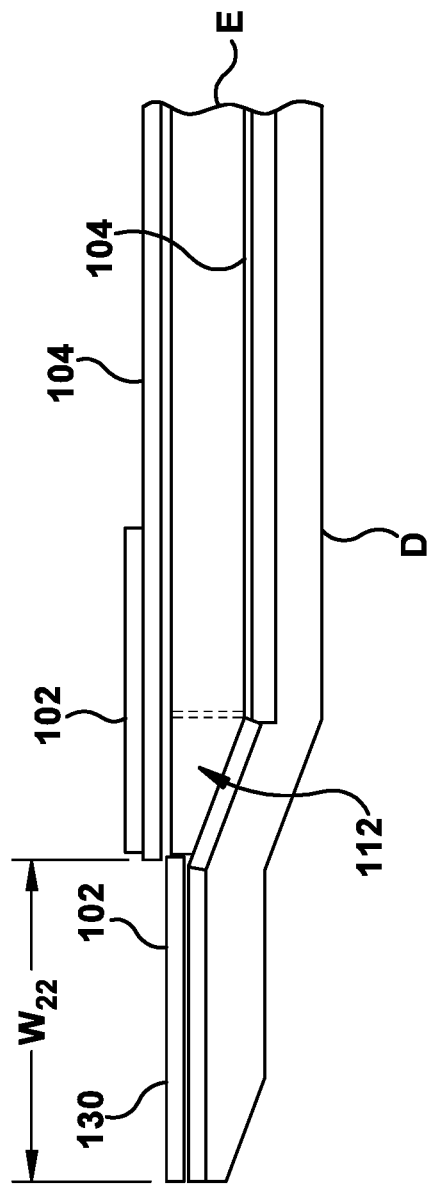
FIG. 10 is a partial sectional view of a partial sectional view of another winding from a continuous fabric is shown in an application orientation.

The wrapping method may also be studied from sectional views of liner on the mandrel. FIGS. 9 and 10 are each sectional views of several windings of a continuous fabric shown in an application orientation. Referring now to FIG. 9, a partial cross-sectional view of a winding shows a fabric with constant thickness from edge to edge. The fabric 100 will be described in reference to FIG. 5. Three loops A, B, C of fabric are shown, with the top surface 102 in a direction away from the mandrel (not shown). The center loop B has only the top layer 102 exposed, and thus, the distance between the loop A and the loop C on the outside of the liner is the width of the top surface in the loop B. One skilled in the art will appreciate that given a predetermined axial speed from the mandrel and a predetermined rotational speed for the mandrel, this overlapping pattern will repeat the length of the liner Still referring to FIG. 9, the top intermediate layer 104 and the bottom intermediate layer 106 are shown. The density of the bottom intermediate layer 106 may be constant from edge to edge, and thus, a shoulder 150 may appear in a repetitive pattern on the top of the liner. This shoulder reduces the surface smoothness of the inside surface of the cured-in-place pipe after impregnation.

Now referring to FIG. 10, a partial cross-sectional view of another winding is shown. Two loops D, E of fabric are shown, with the top surface 102 in a direction toward the mandrel (not shown). The bottom loop D has only the top layer 102 exposed, and thus, the distance between the loops on either side of the loop D is the width of the top surface in the loop B. One skilled in the art will appreciate that given a predetermined axial speed from the mandrel and a predetermined rotational speed for the mandrel, this overlapping pattern will repeat the length of the liner.

FIG. 10 illustrates a fabric that does not have constant thickness from edge to edge. As discussed herein, the continuous fabric 100 includes an edge section 112 having an area of reduced fiber density. With the overwrap application of loop E upon loop D, the edge section 112 reduces in thickness such that the distance between the top layer of loop E and the top layer of loop D decreases, relative to the winding shown in FIG. 9. Reducing the size of the shoulder 150 increases the surface smoothness of the outside surface of the liner, and ultimately, the inner surface of the cured-in-place pipe.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, software, hardware, control logic, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method of manufacturing a repair liner for reinforcing a pipe, the method comprising:
    selecting a continuous fabric having a top layer, a top intermediate layer, and a bottom intermediate layer, wherein a width of the top layer is less than a width of the continuous fabric and a fiber density of the top layer is less than a fiber density of the bottom intermediate layer; and
    wrapping the continuous fabric around a mandrel in an orientation with the top layer outward and in an overlapping pattern with the top layer essentially covering a length of the liner,
    wherein the width of the top layer is less than ⅓ the width of the continuous fabric.

2. The method of claim 1, further comprising:
    moving the mandrel in an upstream direction at a predetermined axial speed;
    rotating the mandrel in a direction away from the continuous fabric and at a predetermined rotational speed; and
    forming repetitive loops of fabric around a circumference of the mandrel;
    wherein an axial length between two adjacent loops on the liner is the same as the width of the top layer of the fabric.

3. The method of claim 1, wherein the top layer is not overlapped upon itself along an axial length of the liner.

4. The method of claim 1, wherein a step is formed at an inner edge of the top layer.

5. A method of manufacturing a repair liner for reinforcing a pipe, the method comprising:
    selecting a continuous fabric having a top layer, a top intermediate layer, and a bottom intermediate layer, wherein a width of the top layer is less than a width of the continuous fabric and a fiber density of the top layer is less than a fiber density of the bottom intermediate layer; and
    wrapping the continuous fabric around a mandrel in an orientation with the top layer outward and in an overlapping pattern with the top layer essentially covering a length of the liner,
    wherein the top layer includes a plurality of fibers, and wherein the fibers are randomly-oriented in the top layer.

6. The method of claim 5, wherein the fibers are glass fibers.

7. The method of claim 5, wherein the fiber density of the top layer is in the range of 10 g/m² to 80 g/m².

8. The method of claim 1, wherein the top intermediate layer includes a plurality of fibers, and wherein the fibers are randomly-oriented in the top layer.

9. The method of claim 8, wherein the fibers are glass fibers.

10. The method of claim 8, wherein a fiber density of the top intermediate layer is in the range of 10 30 g/m² to 50 g/m².

11. The method of claim 1, wherein a width of the top intermediate layer is the same as the width of the continuous fabric.

12. The method of claim 1, wherein the bottom intermediate layer includes a plurality of fibers.

13. The method of claim 12, wherein the fibers are chopped glass fibers.

14. The method of claim 13, wherein a fiber density of the bottom intermediate layer is in the range of 100 g/m² to 400 g/m².

15. The method of claim 12, wherein the fibers are continuous glass fibers.

16. The method of claim 15, wherein a fiber density of the bottom intermediate layer is in the range of 35 g/m² to 700 g/m².

17. The method of claim 1, wherein a width of the bottom intermediate layer is the same as the width of the continuous fabric.

18. A method of manufacturing a repair liner for reinforcing a pipe, the method comprising:

selecting a continuous fabric having a top layer, a top intermediate layer, and a bottom intermediate layer, wherein a width of the top layer is less than a width of the continuous fabric and a fiber density of the top layer is less than a fiber density of the bottom intermediate layer; and wrapping the continuous fabric around a mandrel in an orientation with the top layer outward and in an overlapping pattern with the top layer essentially covering a length of the liner, wherein the bottom intermediate layer is thinner along the outer edges of the continuous fabric than along a centerline of the continuous fabric.

19. The method of claim 18, wherein the bottom intermediate layer is 10% thinner along the outer edges of the continuous fabric than along the centerline of the continuous fabric.

20. The method of claim 18, wherein the bottom intermediate layer is less than 50 mm thick along the outer edges of the continuous fabric.

21. The method of claim 18, wherein the bottom intermediate layer is less than 2 mm thick along the outer edges of the continuous fabric.

22. The method of claim 18, wherein the bottom intermediate layer is less than 1 mm thick along the outer edges of the continuous fabric.

23. The method of claim 1, wherein the continuous fabric further comprises a bottom layer, and wherein the bottom intermediate layer is situated between the top intermediate layer and the bottom layer.

24. The method of claim 1, wherein the continuous fabric further comprises a bottom layer formed below the bottom intermediate layer, and wherein a width of the bottom layer is the same as the width of the continuous fabric.

* * * * *